Figure 1:
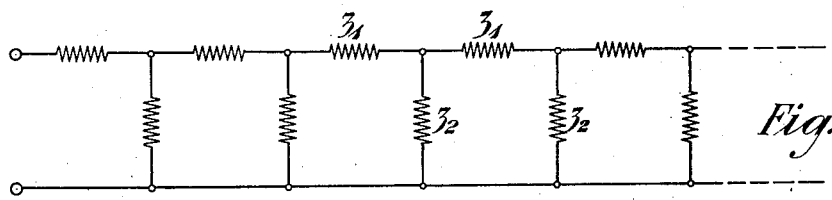

July 26, 1927.

E. DIETZE

ELECTRICAL WAVE FILTER

Filed Sept. 8, 1921

1,636,737

2 Sheets-Sheet 1

INVENTOR
E. Dietze
BY
ATTORNEY

July 26, 1927.
E. DIETZE
1,636,737
ELECTRICAL WAVE FILTER
Filed Sept. 8, 1921
2 Sheets-Sheet 2
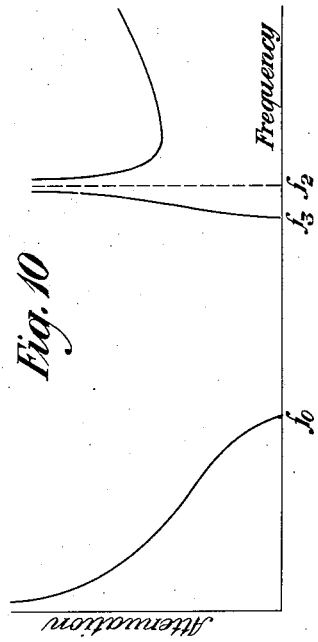
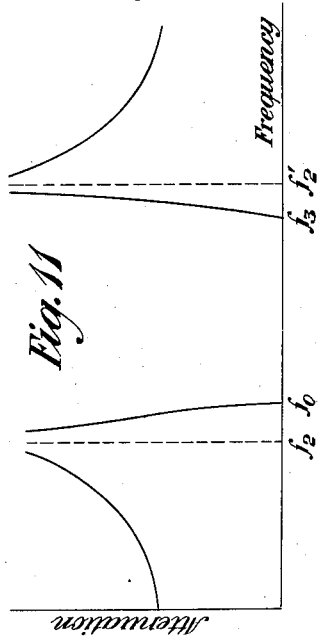
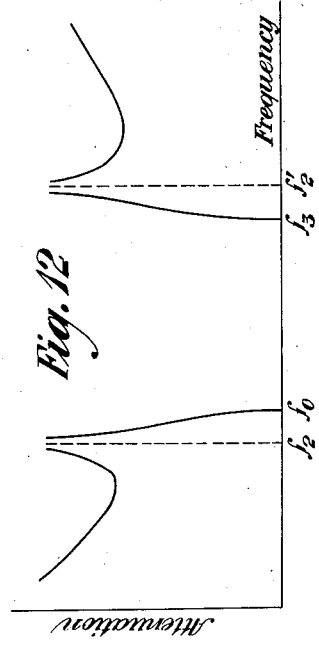
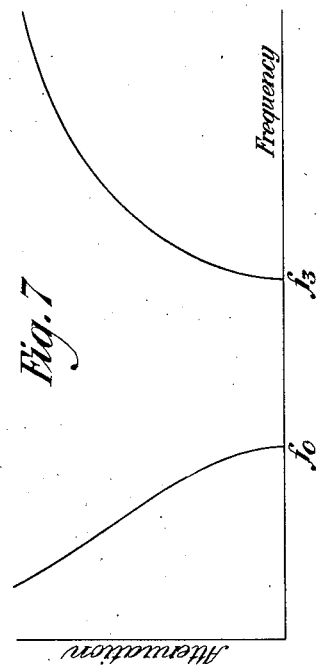
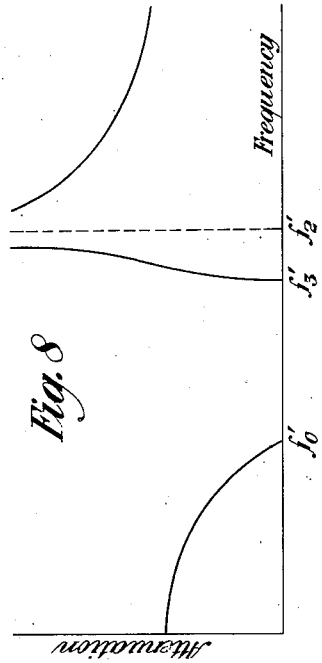
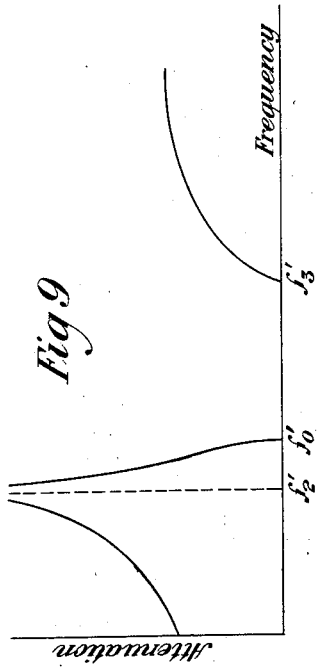
INVENTOR
*E. Dietze*
BY
ATTORNEY Patented July 26, 1927.

1,636,737

UNITED STATES PATENT OFFICE.

EGINHARD DIETZE, OF BROOKLYN, NEW YORK, ASSIGNOR TO AMERICAN TELEPHONE AND TELEGRAPH COMPANY, A CORPORATION OF NEW YORK.

ELECTRICAL WAVE FILTER.

Application filed September 8, 1921. Serial No. 499,191.

The principal object of my invention is to provide a new and improved wave filter having certain desirable operating characteristics. Another object of my invention is to provide a modified single band filter that shall have a sharp cut-off between the freely transmitted frequency range and the attenuating ranges on both sides. Other objects of my invention will become apparent on consideration of the following specification in which I have specifically disclosed a few embodiments with the understanding that the scope of the invention is defined in the appended claims. I now proceed to a specific description of the examples of my invention which I have chosen to illustrate in the drawings.

Figure 2:
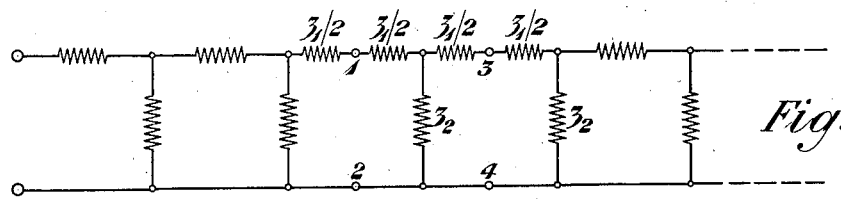
Figure 3:
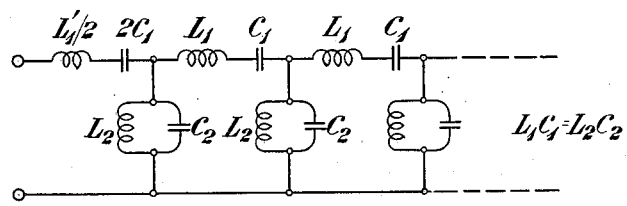
Figure 4:
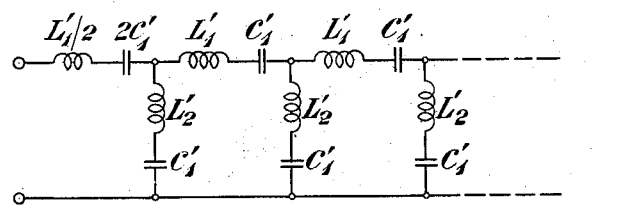
Figure 5:
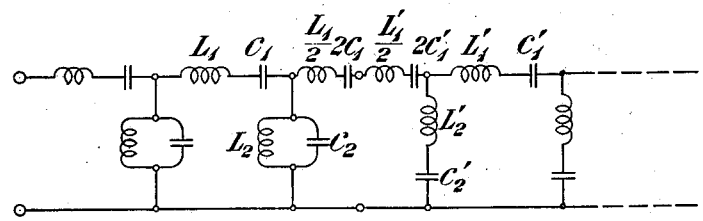
Figure 6:
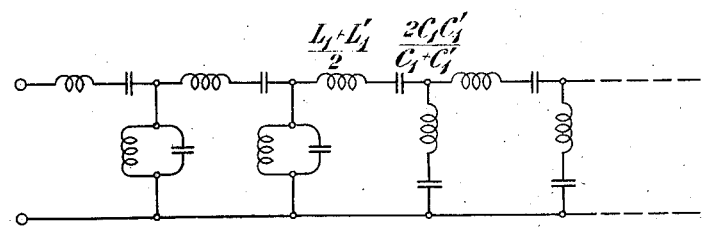

Figure 1 is a diagram showing a wave filter of general type, Fig. 2 is a diagram corresponding to Fig. 1 and having certain modifications to facilitate explanation; Fig. 3 is a diagram of a confluent band type of wave filter; Fig. 4 is a diagram of another type of band pass wave filter; Fig. 5 is a diagram of a composite filter built from elements shown in Figs. 3 and 4; Fig. 6 corresponds to Fig. 5 but has certain impedance elements consolidated; and Figs. 7, 8, 9, 10, 11 and 12 are attenuation-frequency diagrams corresponding to Figs. 3 to 6 and modifications thereof.

In presenting the theory of wave filters, it is customary first to consider a network like that shown in Fig. 1 with series impedances $z_1$ and shunt impedances $z_2$ repeated indefinitely, or in other words extending to infinity. It is assumed that these impedances $z_1$ and $z_2$ are pure reactances, for the reason that the dissipation losses may be neglected with approximate accuracy for many purposes. In practice a reasonable number of the elements $z_1$ and $z_2$ are used, and terminal networks are provided that make the impedance of the finite structure approximately the same as that of the infinite filter.

Since an impedance element such as $z_1$ is equivalent to two impedances each $\frac{1}{2} z_1$ in series, it will be evident that Fig. 2 can be substituted for Fig. 1. The points 1 and 2 or 3 and 4 which divide the series impedance elements are called mid-series points and the section between them is a mid-series section. Since the structure extends to infinity, the impedance across the points 1 and 2 looking to the right will be the same as across the points 3 and 4 looking to the right. This is the mid-series iterative impedance and will be designated Z. Accordingly we have the impedance equation $$Z = \frac{1}{2} z_1 + \frac{z_2(1/2 z_1 + Z)}{z_2 + 1/2 z_1 + Z}$$

whose solution is $$Z = \sqrt{z_1 z_2 + \frac{1}{4} z_1^2} \quad (1)$$

The critical or cut-off frequencies of a filter are known to be given by the equations $$\frac{z_1}{z_2} = 0 \quad (2)$$

and $$\frac{z_1}{z_2} = -4 \quad (3)$$

when solved for the frequency $f$, of which $z_1$ and $z_2$ are functions.

Fig. 3 shows a filter of the so called "confluent band" type. In general such a filter has two separate free transmitting ranges of frequency, but these become adjacent in the confluent band filter, under the condition that $$L_1 C_1 = L_2 C_2 \quad (4)$$

and the frequency at which they meet is given by $$f_1 = \sqrt{f_0 f_3} \quad (5)$$

where $f_0$ and $f_3$ are the critical frequencies at the non-adjacent ends of the freely transmitted frequency ranges. Equation 4 is derived from equation 2. Equation 3 solved for $f$ has two solutions which give $f_0$ and $f_3$. These two solutions with equation 4 give us three design equations toward the determination of $L_1$, $L_2$, $C_1$ and $C_2$ from the preassigned critical frequencies $f_0$ and $f_3$. One more condition is required fully to define $L_1$, $L_2$, $C_1$ and $C_2$. Let the impedance at the mid-frequency $f_1$ be $Z_m$. From equation 1 it can be shown that $$Z_m = \frac{f_3 - f_0}{2 C_1 \cdot 2\pi f_1^2} \quad (6)$$

which gives the requisite fourth condition to determine $L_1$, $L_2$, $C_1$ and $C_2$.

It can also be shown from equation 1 that $$Z = Z_m \frac{\sqrt{(f^2-f_0^2)(f_3^2-f^2)}}{f(f_3-f_0)} \quad (7)$$

In any filter of the general type here considered, $$\cosh(\alpha+i\beta) = 1 + \frac{1}{2}\frac{z_1}{z_2},$$

where $\alpha+i\beta$ is the propagation constant and $\alpha$ is the attenuation constant. Separating this equation into its real and imaginary parts, $\alpha$ can be expressed as a function of frequency $f$, of which $Z_1$ and $Z_2$ are functions. Fig. 7 is a graph of the relation of $\alpha$ and $f$ for the filter of Fig. 3; in other words, Fig. 7 is the attenuation-frequency characteristic for the confluent-band filter of Fig. 3. The other figures 8 to 12 similarly are attenuation-frequency characteristics of filters and are based on the equation $$\cosh(\alpha+i\beta) = 1 + \frac{1}{2}\frac{z_1}{z_2}.$$

Now consider the filter of Fig. 4. This has a single band of transmitted frequencies whose two cut-off frequencies $f_0'$ and $f_3'$ are given respectively by the solutions of equations 2 and 3. A third design condition for $L_1'$, $L_2'$, $C_1'$ and $C_2'$ is given by an equation corresponding to equation 6, namely $$Z_m' = \sqrt{\frac{4C_1'+C_2'}{C_2'}} \cdot \frac{f_3'-f_0'}{2C_1' \cdot 2\pi f_0' f_3'} \quad (8)$$

From physical consideration it is seen that at the resonance frequency $f_2'$ for each shunt combination $L_2' C_2'$, there must be infinite attenuation. This gives a fourth condition, namely $$f_2' = \frac{1}{2\pi\sqrt{L_2'C_2'}} \quad (9)$$

and it is seen that we are free to put this frequency $f_2'$ of infinite attenuation where we please. Fig. 8 shows it close to $f_3'$, the upper cut-off frequency, and Fig. 9 shows it close to $f_0'$, the lower cut-off frequency. Figs. 8 and 9 are for the filter of Fig. 4.

From equations 1 and 8 it can be shown that the impedance for the filter of Fig. 4 is given by $$Z' = Z_m' \sqrt{\frac{(f'^2-f_0'^2)(f_3'^2-f'^2)}{f'(f_3'-f_0')}} \quad (10)$$

Comparison of equations 7 and 10 shows that if for the two filters of Figs. 3 and 4, we make the cut-off frequencies the same, that is if we make $f_0=f_0'$ and $f_3=f_3'$ and if we make the impedances the same at mid-frequency $$f_1 = \sqrt{f_0 f_3},$$

that is if we make $Z_m = Z_m'$; then the impedances are the same over the entire frequency ranges, that is $Z = Z'$. This is true no matter how we determine $f_2'$.

Since the impedances are the same for the filters of Figs. 3 and 4 provided $f_0 = f_0'$, $f_3 = f_3'$ and $Z_m = Z_m'$, it follows that we can put a section or sections of one in sequence with a section or sections of the other and have no reflection effects, or we can put together sections of Fig. 4 having different values of $f_2'$. Thus filters can be built up having attenuation characteristics obtained by adding the ordinates of Figs. 7, 8 and 9 or any two of these.

Fig. 10 illustrates the case when the filter of Figs. 3 and 7 is combined with the filter of Figs. 4 and 8. It will be noted that the combination sharply discriminates against frequencies at the right-hand edge of the free transmission range, and also has high attenuation for frequencies considerably removed from the limiting frequencies. It will readily be seen that, by combining sections of the filters of Figs. 7 and 8 another composite filter will be obtained, which is in every respect similar to the one whose characteristic is shown in Fig. 10 except that the sharp discrimination is on the left-hand side of the free transmission range.

Fig. 11 illustrates the case of a combination of two filters, each structurally like Fig. 4 but with their parameters chosen so that their characteristics correspond respectively to Figs. 8 and 9. It will be seen from an inspection of this Fig. 11 that the attenuation rises sharply on both sides of the free transmission range. Choosing the frequencies of maximum attenuation of the two filters an equal distance from the upper or respectively lower limiting frequency of the free transmission band, a composite filter is obtained having an attenuation characteristic which is very nearly symmetrical with respect to the mid-frequency of the free transmisison band. The combination gives a band filter with good selectivity on both sides of the free range, but the attenuation assumes relatively low values for frequencies considerably removed from the edge of the free band.

Fig. 12 shows the combination of a composite filter of the type shown in Fig. 11 with a confluent band filter of Fig. 7. This combination combines the advantages of sharp discrimination on both sides of the free range with high attenuation for frequencies considerably removed from the free transmission band.

The Figs. 10, 11 and 12 illustrate the characteristics of the different composite filters which may be obtained by combination of filters of Figs. 3 and 4. A variation in these characteristics may be obtained by the use of different numbers of sections of each type entering into the combinations. Thus, for instance, if in the combination illustrated in Fig. 12, it is desired to obtain sharp selectivity at the edge of the band, this may be obtained by using a correspondingly larger number of sections of filters according to Fig. 4 than of Fig. 3. Similarly, if the emphasis is on obtaining high attenuation for frequencies considerably removed from the free range, it will be desirable to use a correspondingly large number of sections of Fig. 3 than of Fig. 4. Other composite filters can be obtained by the combination of sections of filters corresponding to Fig. 3 with sections of filters corresponding to Fig. 4 designed to have different frequencies of infinite attenuation $f_2, f_2', f_2''$, etc., by which means very high attenuation can be obtained at a number of frequencies which it is desired completely to suppress.

I claim:

1. A band filter having sections of different type, the sections of one type being such that a complete filter of sections of that type will have a different attenuation frequency characteristic but the same cut-off frequencies as a filter whose sections are all of another type involved, whereby the composite filter combines the advantages of the different attenuation frequency characteristics.

2. A band filter having different kinds of sections, the sections of each kind being such that a complete filter of one kind of sections will have a different attenuation frequency characteristic from the others, but the same critical frequency and the same impedance frequency characteristic as the others.

3. A band filter having its cut-off sharpened by the replacement of a section thereof by a section of different type whereby its attenuation characteristic is made steeper near its critical frequency, the said substituted section being such that a filter with all its sections like it will have the same critical frequencies.

4. A band filter having sections of the same critical frequencies but different attenuation frequency characteristics, one section giving high attenuation over one frequency range and another section over another frequency range, whereby the composite filter gives high attenuation over both ranges.

5. A band filter having mid-series sections of two types of filters of the same critical frequencies and the same mid-frequency impedance but having different attenuation characteristics, whereby the composite filter combines the advantages of both characteristics.

6. A band filter having four elements per section, one section being of confluent band type and another section having the same critical frequencies as the confluent band section and the same mid-frequency impedance and also having a frequency of maximum attenuation close to one of said critical frequencies.

In testimony whereof, I have signed my name to this specification this 1st day of September 1921.

EGINHARD DIETZE.